US007663855B2

(12) United States Patent
Huang et al.

(10) Patent No.: US 7,663,855 B2
(45) Date of Patent: Feb. 16, 2010

(54) CIRCUIT FOR PREVENTING SURGE, CONNECTOR AND ELECTRONIC APPARATUS THEREOF

(75) Inventors: Chien-Hsiang Huang, Taipei Hsien (TW); Muh-Jin Uang, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 433 days.

(21) Appl. No.: 11/737,600

(22) Filed: Apr. 19, 2007

(65) Prior Publication Data

US 2008/0212250 A1 Sep. 4, 2008

(30) Foreign Application Priority Data

Mar. 2, 2007 (TW) .............................. 96107141 A

(51) Int. Cl.

| | |
|---|---|
| ***H02H 3/22*** | (2006.01) |
| *H02H 1/00* | (2006.01) |
| *H02H 1/04* | (2006.01) |
| *H02H 9/06* | (2006.01) |
| *H02H 7/12* | (2006.01) |

(52) U.S. Cl. ........................ 361/111; 361/117; 361/118

(58) Field of Classification Search .......... 361/117–119
See application file for complete search history.

(56) References Cited

U.S. PATENT DOCUMENTS

| | | | | |
|---|---|---|---|---|
| 3,087,093 | A | 4/1963 | Bourgerie et al. | 317/12 |
| 4,532,419 | A | 7/1985 | Takeda | 235/492 |
| 5,508,876 | A * | 4/1996 | de la Croix Vaubois et al. | 361/117 |
| 6,450,837 | B1 | 9/2002 | Givens et al. | 439/620 |
| 7,245,511 | B2 * | 7/2007 | Lancaster et al. | 363/53 |
| 2006/0087821 | A1 | 4/2006 | Makino et al. | 361/777 |

FOREIGN PATENT DOCUMENTS

AU 579383 11/1988

* cited by examiner

*Primary Examiner*—Albert W Paladini
*Assistant Examiner*—Dharti H Patel
(74) *Attorney, Agent, or Firm*—J.C. Patents

(57) ABSTRACT

A surge protection circuit and a connector and an electronic apparatus using the circuit are provided. The connector includes a plurality of metal lines, a plurality of resistors, a ground metal, and a capacitor. Each metal line has a pointed end. There is a distance between the pointed end of the metal lines and a pointed end of the first end of each resistor corresponding to the metal line. The capacitor is coupled between the ground metal and second end of the resistors. Thus the surge endurance of product can be increased by the invention, and the damage to the internal components of product can be prevented.

19 Claims, 7 Drawing Sheets

100

CIRCUIT FOR PREVENTING SURGE, CONNECTOR AND ELECTRONIC APPARATUS THEREOF

CROSS-REFERENCE TO RELATED APPLICATION

This application claims the priority benefit of Taiwan application serial no. 96107141, filed Mar. 2, 2007. All disclosure of the Taiwan application is incorporated herein by reference.

BACKGROUND OF THE INVENTION

1. Field of Invention

The present invention relates to a surge protection circuit, more specifically, the present invention relates to a surge protection circuit and a connector and electronic apparatus using the same.

2. Description of Related Art

Surges may affect a product itself (for example computer or telephone, etc.) through power line or grounding path. The degree and range of the affection thereof vary with the inbreak path and the magnitude of the energy, wherein the worst situation is the damage resulted from a direct penetrated surge inside a product. Lightning strike is a main surge source, and a lightning rod is a device that actively inducts the lightning energy to discharge. Since the lightning current may cause a voltage increase on the grounding resistor, and the current may be passed to a product end through the circuit coupling buried under the ground and consequently damage the internal components of a product, and cause malfunctions, or even worse damage the whole product.

Since there is no relevant regulation on the surge test for products, therefore little protection is applied during the development phase. As electromagnetic interference attracts more and more considerations, manufacturers and companies from different countries gradually require surge endurance of products, i.e. a surge on signal line to signal line (line-to-line) and signal line to ground (line-to-ground) must be conducted. During the actual test, the endurance of connectors of existing general products is listed below: for line-to-line surge test, when the surge voltage is as high as 700V, the product still can be normally used. When the surge voltage is 800V, the product loses functionality permanently. For line-to-ground surge test, when the surge voltage is as high as 2.7KV, the product still can be normally used. When the surge voltage is 2.8KV, then the product loses functionality permanently. However, when the surge voltage is 3.5KV, then the internal chip of the product is burnt right away.

The conventional surge protection apparatus is, for example: (1) A transformer that reduces the high voltage energy is disposed in the circuit of a product. However such method might pass the high voltage into a product without reducing the energy due to the bad design of the transformer, and results in the damage to the product. (2) A Surge absorber, for example a zener diode or a metal oxide varistor is used. In the case of zener, the surge absorber is useless under a normal circuit voltage. When the voltage suddenly increases (for example switch surges, static, even lightning strikes occur), the surge absorber may become an ON-state when the external voltage is higher than its breakdown voltage. At this moment, a portion of the current generated due to sudden increased voltage is absorbed by the surge absorber, and another portion of current will be passed to the earthing end via the surge absorber to avoid the protected circuit in the back end being damaged by the sudden increased voltage.

Although this component can be used in product surge protection, however the cost is relatively high. Therefore a low cost apparatus with higher endurance during lightning strike will be a trend of the future development.

SUMMARY OF THE INVENTION

The present invention is directed to provide a surge protection circuit and a connector and an electronic apparatus using the same, so as to increase the surge endurance of a product, and to reduce the cost of the circuit components.

The present invention provides a surge protection circuit, including a first metal line, a resistor, a grounding metal and a capacitor. The first metal line has a pointed end. There is a predetermined distance between the first end of the resistor and the pointed end of the first metal line. The capacitance is coupled between the grounding metal and the second end of the resistor.

The present invention further provides a connector, including a plurality of metal lines, a plurality of resistors, a grounding metal and a capacitor. Each metal line has a pointed end. There is a predetermined distance between the first end of each resistor and the corresponding pointed end of the metal line. The capacitor is coupled between the grounding metal and the second end of the resistor.

The present invention further provides an electronic apparatus, including a connection portion, wherein the connection portion has a first metal line, a resistor, a grounding metal and a capacitor. The first metal line has a pointed end. The first end of the resistor and the pointed end of the first metal line has a predetermined distance. The capacitor is coupled between the first grounding metal and the second end of the resistor.

The present invention has the following advantages. (1) Can be connected in series to the existing product to increase the surge endurance of the product without replacing the existing equipment of the product. (2) A non-contact design is used in the line-to-ground protection circuit, therefore the signal interference can be avoided. (3) The size of the circuit is small, and no extra power is required. Therefore the product's endurance withstanding the surge-generated high voltage energy can be effectively increased, and the circuit cost can be reduced.

In order to the make the aforementioned and other objects, features and advantages of the present invention comprehensible, a preferred embodiment accompanied with figures is described in detail below.

DESCRIPTION OF EMBODIMENTS

First Embodiment

Figure 1:
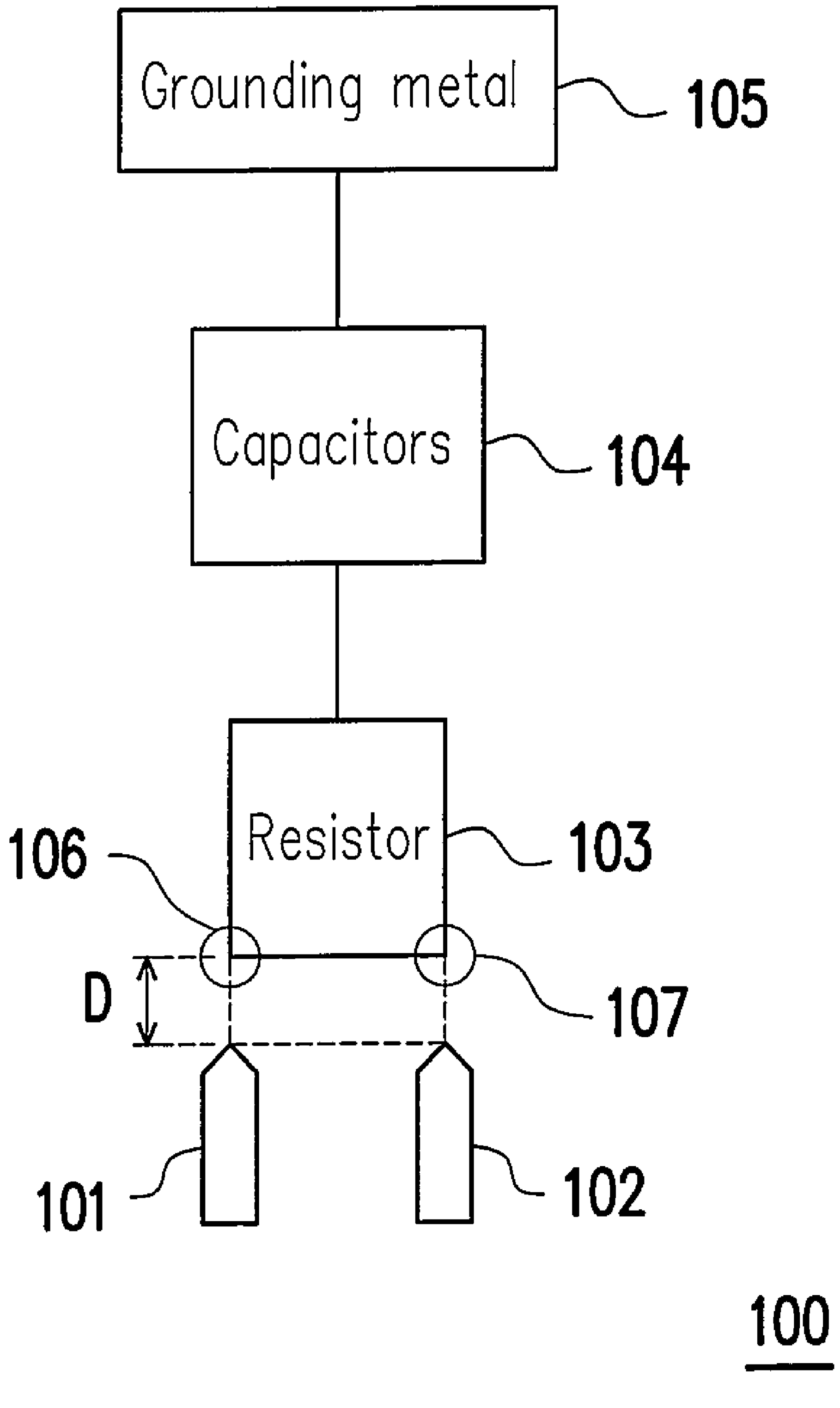
FIG. 1 is a schematic diagram of a surge protection circuit of the first embodiment of the present invention.

FIG. 1 is a schematic diagram of a surge protection circuit of the first embodiment of the present invention. With reference to FIG. 1, the surge protection circuit 100 includes a first metal line 101, a second metal line 102, a resistor 103, a capacitor 104 and a grounding metal 105. The first metal line 101 and the second metal line 102 both have a pointed end (as shown in the FIG. 1). There is a distance D (preferably 5~40 mil) respectively between the pointed end of the first metal line 101, the pointed end of the second metal line 102 and the first pointed end 106 and the second pointed end 107 of the first end of the resistor 103 (for example here the resistor is a SMD resistor). The distance D is determined depending on different application. The capacitor 104 (for example here is a high voltage ceramic capacitor) is coupled between the grounding metal 105 and the second end of the resistor 103.

The connection method of the components of the surge protection circuit 100 has been described above, and the metal lines 101, 102 of the surge protection circuit 100 do not connect to the resistor 103 directly. Since when surge voltage is generated, if the metal lines 101, 102 connect to the resistor 103 directly, a feedback effect will be generated when the surges travel through the metal lines 101, 102, the resistor 103 to the capacitor 104. That is, the surge voltage is feed back to the metal lines 101 and 102 through the resistor 103, and therefore the surge voltage can not be discharged as expected, and results in damage in the circuit.

Next, the operation details of the present embodiment are further described. Using the point discharge principle, the present embodiment passes the lightning strike energy received on the first metal line 101 and the second metal line 102 to the grounding metal 105 through the resistor 103 and the high voltage capacitor 104 to release the energy. Therefore the high voltage energy would not be conducted into the product (for example desktop or laptop computer, telephone, etc.), thus the internal component of product can be effectively protected by the surge protection circuit.

Since point discharge is a non-contact design, i.e. as shown in FIG. 1, a distance D exists between the metal lines 101, 102 and the resistor 103, and the two pointed ends 106, 107 (one can also use the copper pour on the circuit board to form the pointed ends for other types of resistors) of the first end of the resistor 103 are opposite to the pointed ends of the two metal lines 101, 102 respectively, therefore the signals transmitted through the metal lines 101, 102 will not be affected by such design. When lightning strike energy is introduced through the metal lines 101, 102, the energy is discharged through the pointed ends of metal lines 101, 102. And during the discharge, the lightning strike energy is attenuated by the energy loss resulted from electrical energy to light energy conversion. Next, the energy is conducted to the resistor 103 through point discharge. And because of the damping effect of the resistor 103, the energy is converted into heat loss and is released to earth through the high voltage capacitor 104. The above RC circuit comprising the 103 and 104 can buffer the lightning strike energy to extend the discharging time, so that the energy is lost herein and the rest of the energy is conducted to the earth, therefore the impact to the original circuit is greatly reduced.

Second Embodiment

Figure 2:
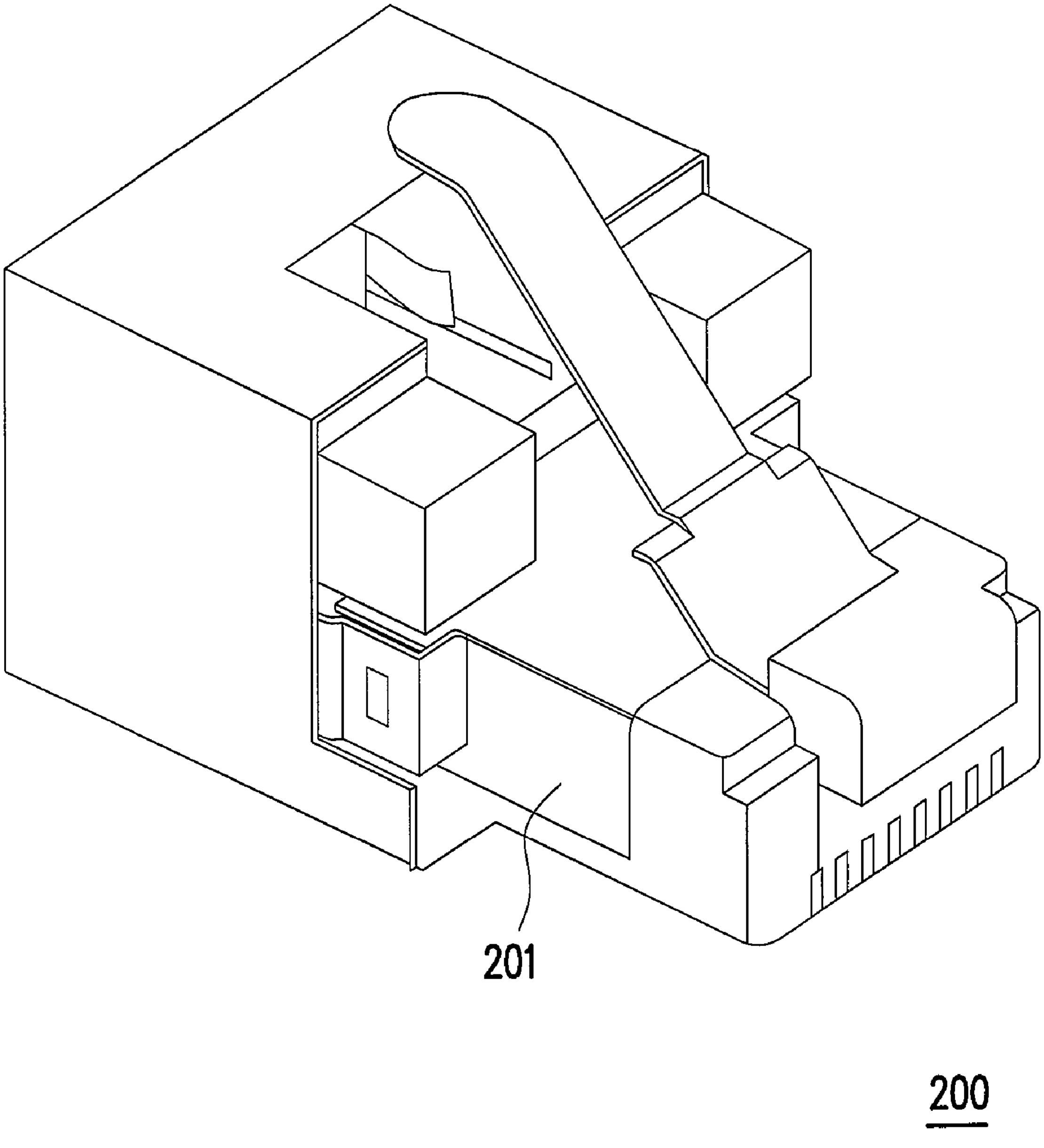
FIG. 2 is a schematic external diagram of a surge protection connector of the second embodiment of the present invention.
Figure 3:
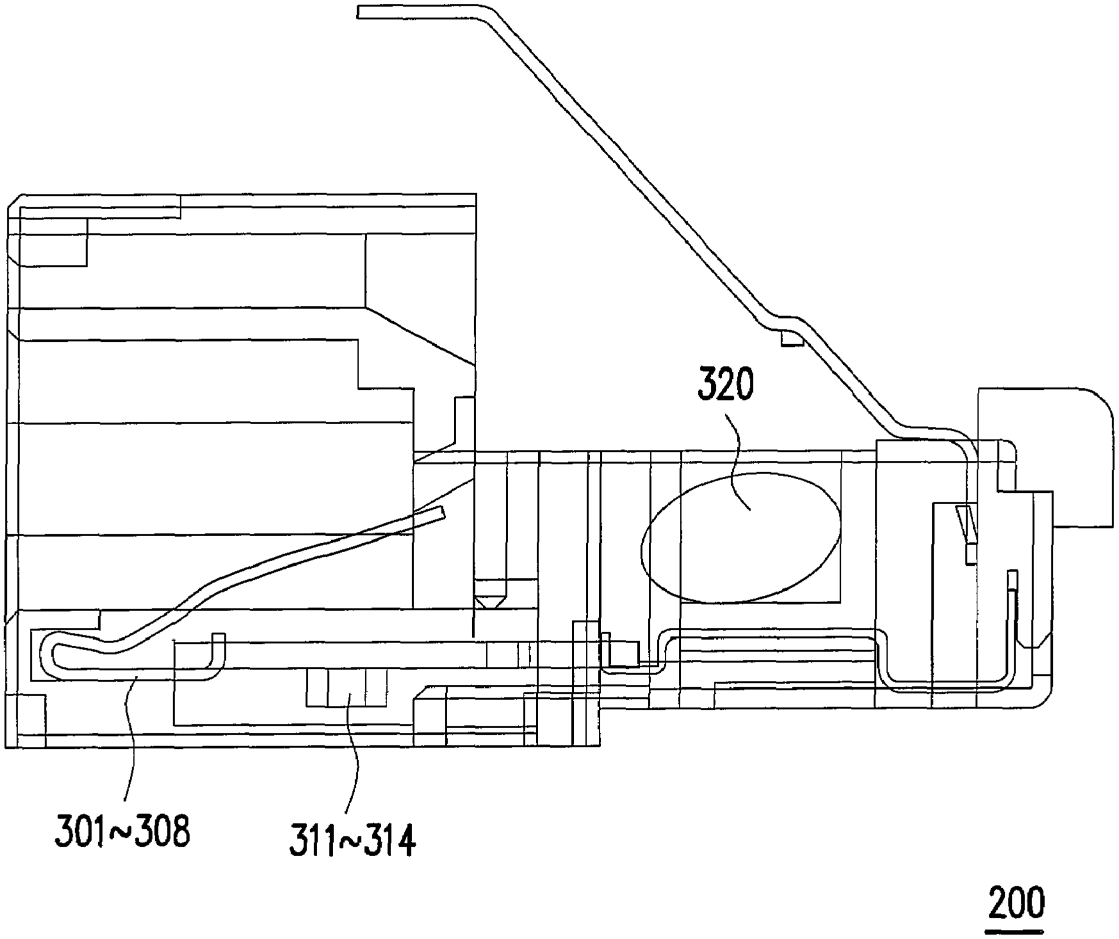
FIG. 3 is a schematic internal diagram of a surge protection connector of the second embodiment of the present invention.
Figure 4:
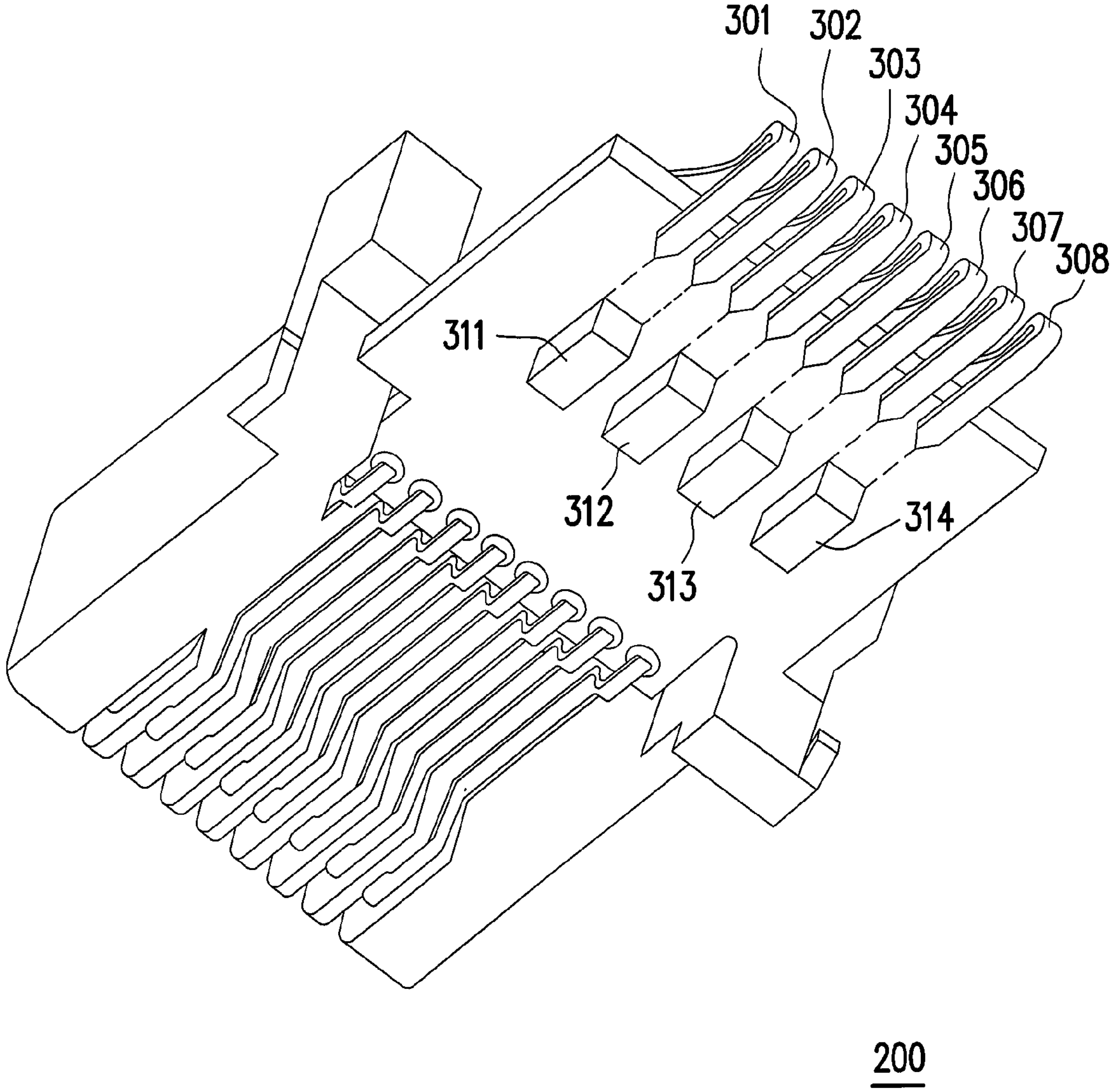
FIG. 4 is a schematic bottom circuit diagram of a surge protection connector of the second embodiment of the present invention.
Figure 5:
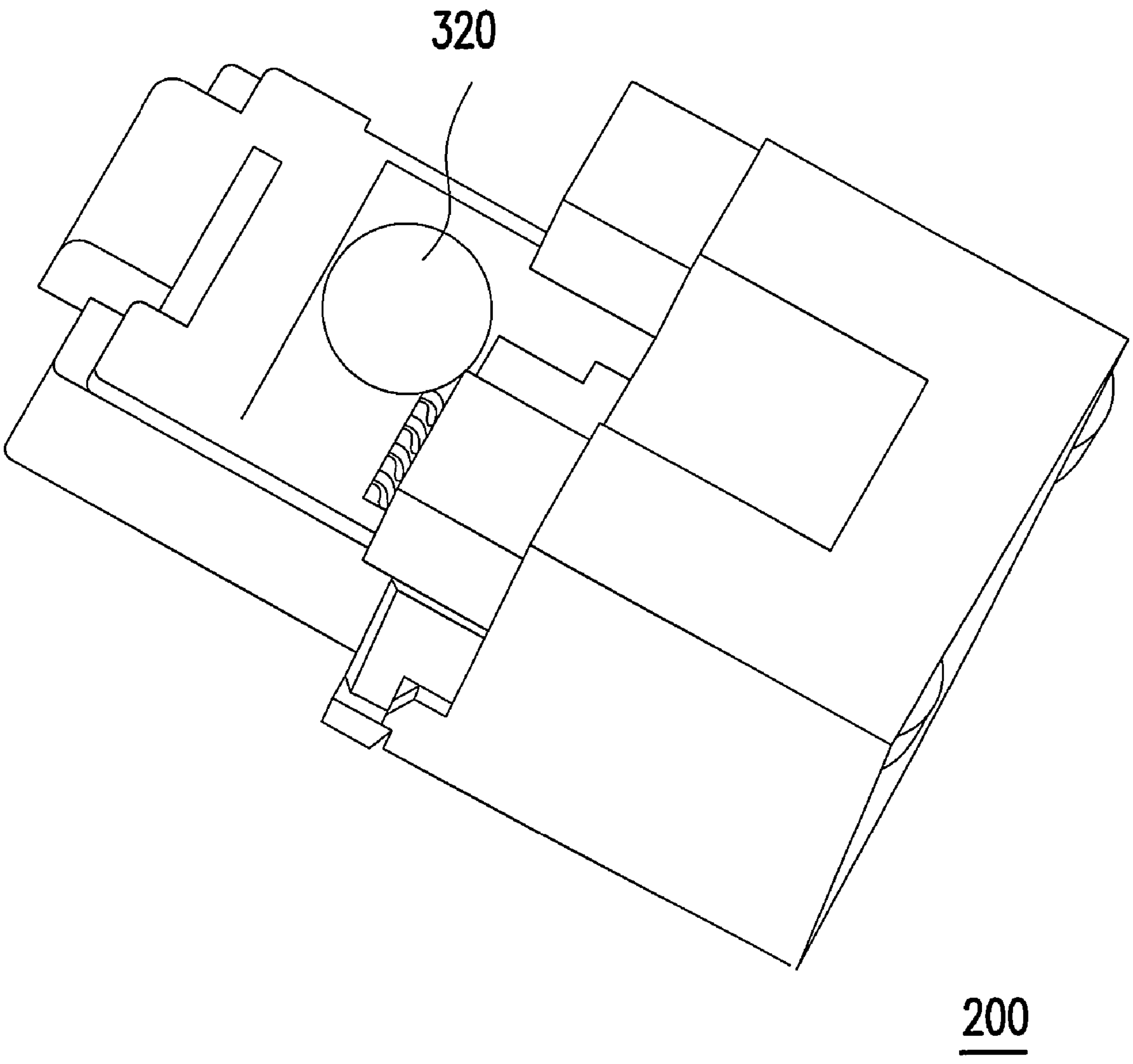
FIG. 5 is a schematic external top view of a surge protection connector of the second embodiment of the present invention.

FIG. 2 is a schematic external diagram of a surge protection connector of the second embodiment of the present invention. FIG. 3 is a schematic internal diagram of a surge protection connector of the second embodiment of the present invention. FIG. 4 is a schematic bottom circuit diagram of a surge protection connector of the second embodiment of the present invention. FIG. 5 is a schematic external top view of a surge protection connector of the second embodiment of the present invention. With reference to FIG. 2, 3, 4, 5, the connector 200 has eight metal lines 301~308, four resistors 311~314, a capacitor 320 and a grounding metal 201. The metal lines 301~308 all have a pointed end respectively. The left and right pointed ends of the first end of the resistors 311~314 respectively correspond to the first ends of the metal lines 301~302, 303~304, 305~306, 307~308, and there is a distance between the left and right pointed ends of the first end of the resistors 311~314 and the corresponding first ends of the metal lines 301~308, as the method shown in FIG. 1 (i.e. the distance D is 5 mil~40 mil). The capacitor 320 is disposed between the resistors 311~314 and the grounding metal 201 (as the circled portion shown in FIG. 3 and FIG. 5). The connector 200 is a network connector. The surge voltage discharge process of the connector 200 is the same as the first embodiment, therefore will not be described again.

The skilled persons in the field can understand from the above FIG. 2, 3, 4, 5, the embodiment is a network connector designed using the concept of the embodiment of FIG. 1. When a computer is connected to the network through the above connector 200, the high voltage energy generated by surges can be discharged by the connector 200, so that the network chip and other component in the computer will not be damaged due to the high voltage energy of surges. Those skilled in the art can also develop telephone connectors or connectors used in other products using the similar structure.

Next, the Table 1 below shows the surge endurance test results before and after the connector 200 is plugged into a computer. The testing method is as below. When a computer is connected to the network through the connector 200, a surge voltage is applied directly through a network cable to perform line-to-line and line-to-ground tests respectively. During the test, the applied test voltage for example is increased at 100V increment at each time. (1) In line-to-line test, a surge voltage is applied to seven metal lines 301~307 of the metal lines 301~308, and the surge current will be discharged via the rest one metal line 308 to complete the line-to-line surge voltage test of the connector 200. (2) In the line-to-ground test, a voltage is introduced through the metal lines 301~308, and is discharged through the resistors 311~314, the capacitor 320, the grounding metal 201 using the point discharge principle to complete the line-to-ground surge voltage test of the connector 200.

TABLE 1

| Line-to-line surge voltage test | | Line-to-ground surge voltage test | |
|---|---|---|---|
| Regular connector | The connector of the present embodiment | Regular connector | The connector of the present embodiment |
| 700 V | 1.2 KV | 2.8 KV | 3.5 KV |

It is seen from the above test results, in the lint-to-line surge voltage test, the maximum endurance voltage of the computer coupled with the connector 200 is 1.2KV; in the line-to-ground surge voltage test, the maximum endurance voltage of the computer coupled with the connector 200 is 3.5KV. While for the computer not coupled with the above connector 200, in the line-to-line surge voltage test, the maximum limit endurance surge voltage can only reach 700V; in the line-to-ground surge voltage test, the maximum limit of the endurance surge voltage can only reach 2.8KV. Base the above test results, those with common knowledge in the field can conclude that the connector implemented according to the concept of the present invention can increase the surge endurance of a product. Therefore the connector implemented according to the spirit of the present invention can effectively protect product itself and the internal components thereof, and the resistors and capacitors used in the internal components are less expensive than the conventionally used surge absorber, therefore the product cost can be reduced.

Third Embodiment

Figure 6:
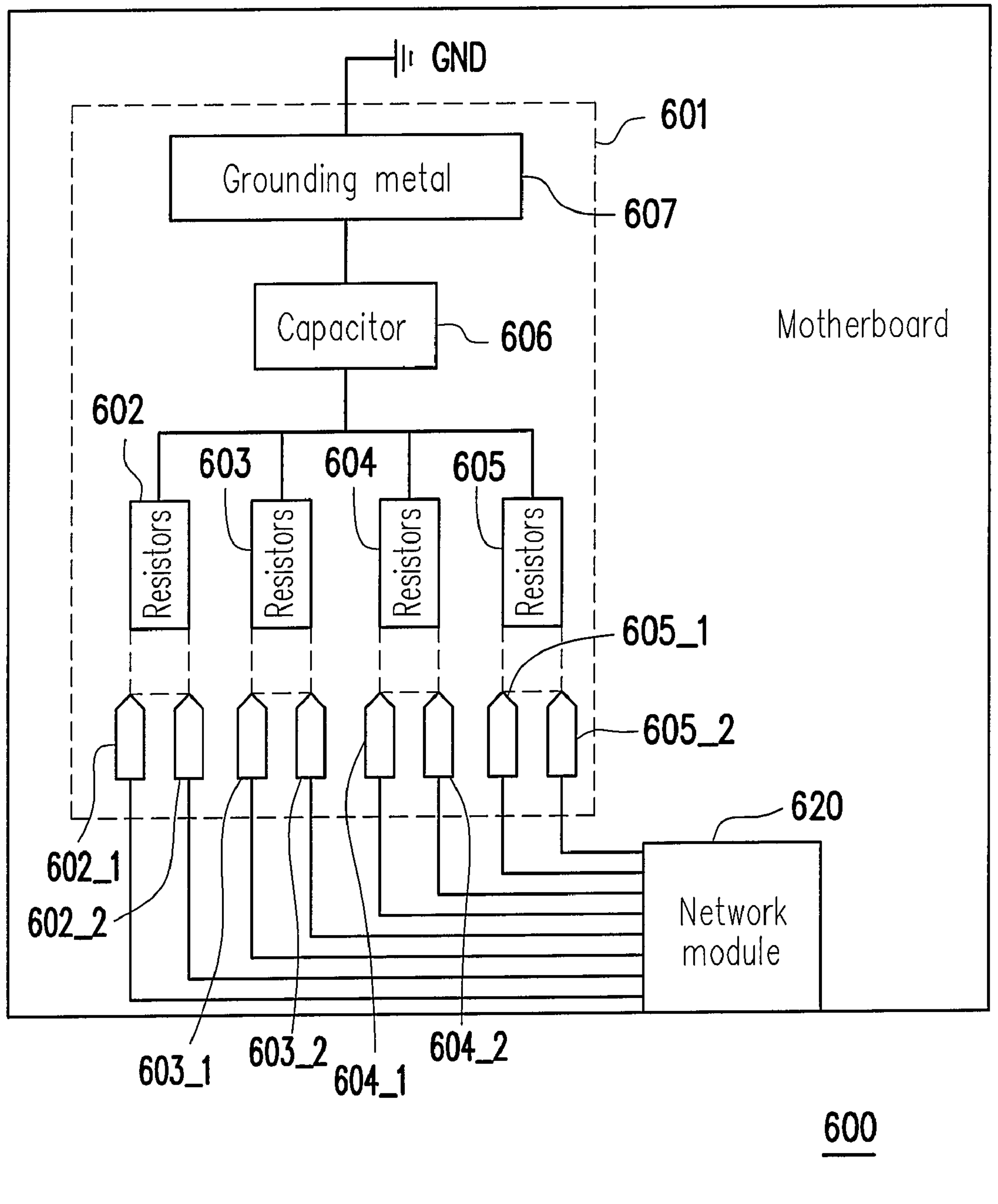
FIG. 6 is a schematic diagram of a surge protection electronic apparatus of the third embodiment of the present invention.

FIG. 6 is a schematic diagram of a surge protection electronic apparatus of the third embodiment of the present invention. With reference to FIG. 6, in present embodiment, the electronic apparatus 600 for example is a motherboard of a desktop or a laptop computer comprising the connection portion 601. And the internal structure of the connection portion 601 is similar to the surge protection circuit 100 of FIG. 1. The operation principle of the surge voltage of the electronic apparatus 600 is similar to the first embodiment, therefore will not be repeated here. The connector mentioned in the second embodiment is to connect the external of a computer to the network connection port of the computer motherboard, however the connection portion 601 of the embodiment can be directly disposed on the motherboard of a desktop or a laptop computer. The grounding metal 607 is connected to the common grounding (GND) of the computer motherboard, and the metal lines 602_1~605_1, 602_2~605_2 are connected to the network module 620 to release the energy of outside surges and to fulfill the surge protection mechanism.

Figure 7:
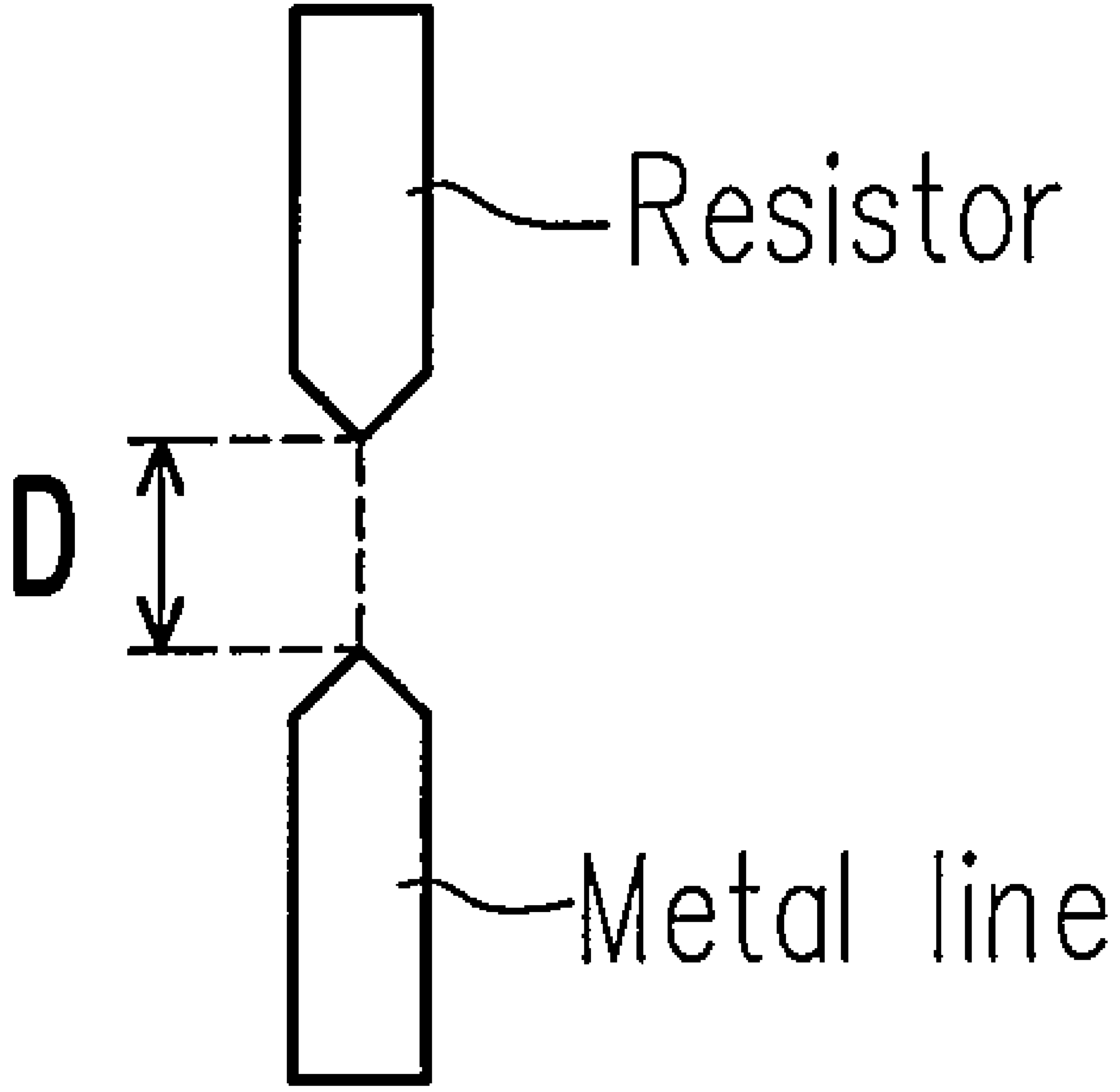
FIG. 7 is a schematic diagram of corresponding relation of the components of another surge protection circuit of the embodiment of FIG. 1.

The above embodiment uses the method of one resistor corresponding to two metal lines; other embodiments may also use one resistor corresponding to one metal line. The pointed end (or uses copper pour to form the pointed end) of the resistor and the pointed end of the metal line are on the same axis, and as shown in FIG. 7, there is a distance D (i.e. non-contact connection method) between the pointed end of the resistor and the pointed end of the metal line to fulfill the point discharge principle.

In addition, the above embodiments are only preferred embodiments. In actual use, the pointed ends of the metal lines do not have to be strictly aligned to the pointed ends of the resistors to complete point discharge. That is, point discharge may happen at any portions of the pointed end of the metal line and the first end of the resistor. Comparing with the pin-to-pin (pointed end to pointed end) method, the result may not be as good, but it still is an application method of the surge protection circuit of the present invention.

One should be mentioned, although the above embodiments described a possible pattern of a surge protection circuit and a connector and a electronic apparatus thereof, however, those with common knowledge in the field should know that the ways of design of the surge protection circuit 100, the connector 200 and the electronic apparatus 600 from different manufacturers and companies are all different, therefore the application of the present invention should not be limited to the present possible pattern. In other words, as long as the point discharge principle is used in the surge protection circuit 100, the connector 200 and the electronic apparatus 600, and the surge voltage is passed to a resistor, a capacitor through metal lines to a grounding metal to perform discharge, the above process has conformed to the spirit of the present invention.

To sum up, the present invention has the following advantages. (1) Can be connected to an existing product in series, and can increase the surge endurance of a product without replacing the existing equipment of a product. (2) A non-contact design used on a line-to-ground circuit can avoid signal interference. (3) The circuit is small in size and easy to connect and no extra power is required. Therefore the endurance of the product to withstand the high voltage energy generated when surge occurs can be effectively increased. The line-to-line endurance is increased from original 700V to 1.2KV, and the line-to-ground endurance is increased from original only 2.8KV to 3.5KV, and the cost of the components used in the circuit can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A surge protection circuit, comprising:

a first metal line, having a pointed end;

a resistor, the first end thereof having a predetermined distance with the pointed end of the first metal line, wherein the first metal line is not connected to the resistor;

a grounding metal; and a capacitor, coupled between the grounding metal and the second end of the resistor.

2. The surge protection circuit of claim 1, further comprising:

a second metal line, having a pointed end, and having a predetermined distances with the first end of the resistor.

3. The surge protection circuit of claim 1, wherein the first end of the resistor has a first pointed end, and there is a predetermined distance between the first pointed end and the pointed end of the first metal line, wherein the distances between the rest portions of the resistor and the pointed end of the first metal line are all greater than the predetermined distance.

4. The surge protection circuit of claim 3, further comprising:

a second metal line, having a pointed end;

wherein the first end of the resistor further comprising a second pointed end, and there is a predetermined distance between the second pointed end and the pointed end of the second metal line, wherein the distances between the rest portions of the resistor and the pointed end of the second metal line are all greater than the predetermined distance.

5. The surge protection circuit of claim 1, wherein the resistor is a surface-mount device (SMD) resistor.

6. The surge protection circuit of claim 1, wherein the capacitor is a high voltage ceramic capacitor.

7. The surge protection circuit of claim 1, wherein a range of the predetermined distance is between 5 mil~40 mil.

8. A connector, comprising:

a plurality of metal lines, and each metal line comprising a pointed end respectively;

a plurality of resistors, the first end of each said resistor comprising a predetermined distance with the corresponding pointed end of the metal line;

a grounding metal; and a capacitor, coupled between the grounding metal and the second ends of the above a plurality of resistors.

9. The connector of claim 8, wherein the first end of the resistor further comprising a pointed end, and there is a predetermined distance between the pointed end and the pointed end of the corresponding metal line, wherein the distances between the rest portions of the resistor and the pointed end of the corresponding metal line are all greater than the predetermined distance.

10. The connector of claim 8, wherein the resistor is a surface-mount device (SMD) resistor.

11. The connector of claim 8, wherein the capacitor is a high voltage ceramic capacitor.

12. The connector of claim 8, wherein a range of the predetermined distance is between 5 mil~40 mil.

13. An electronic apparatus, comprising:

a connection portion, comprising:

a first metal line, having a pointed end;

a resistor, the first end thereof having a predetermined distance with the pointed end of the first metal line, wherein the first metal line is not connected to the resistor;

a grounding metal; and a capacitor, coupled between the grounding metal and the second end of the resistor.

14. The electronic apparatus of claim 13, wherein the connection portion further comprising:

a second metal line, having a pointed end, wherein there is a predetermined distance between the pointed end and the first end of the resistor.

15. The surge protection circuit of claim 13, wherein the first end of the resistor has a first pointed end, and there is a predetermined distance between the first pointed end and the pointed end of the first metal line, wherein the distances between the rest portions of the resistor and the pointed end of the first metal line are all greater than the predetermined distance.

16. The surge protection circuit of claim 15, further comprising:

a second metal line, having a pointed end;

wherein the first end of the resistor further has a second pointed end, and there is a predetermined distance between the second pointed end and the pointed end of the second metal line, wherein the distances between the rest portions of the resistor and the pointed end of the second metal line are all greater than the predetermined distance.

17. The electronic apparatus of claim 13, wherein the resistor is a surface-mount device resistor (SMD resistor).

18. The electronic apparatus of claim 13, wherein the capacitor is a high voltage ceramic capacitor.

19. The electronic apparatus of claim 13, wherein a range of the predetermined distance is between 5 mil~40 mil.

* * * * *